United States Patent

Fishback et al.

Patent Number: 6,000,877
Date of Patent: Dec. 14, 1999

[54] PLASTIC ASPHALT PAVING MATERIAL AND METHOD OF MAKING SAME

[75] Inventors: Gary M. Fishback, Coyote, N.Mex.; Dennis M. Egan; Hilary Stelmar, both of El Cajon, Calif.

[73] Assignee: Plasphalt Project Ltd. Co., Albuquerque, N.Mex.

[21] Appl. No.: 08/995,954

[22] Filed: Dec. 22, 1997

Related U.S. Application Data

[63] Continuation-in-part of application No. 08/555,527, Nov. 9, 1995, Pat. No. 5,702,199.

[51] Int. Cl.$^6$ .................................................... E01C 7/26
[52] U.S. Cl. ...................... 404/17; 404/72; 106/281.1; 106/284.01
[58] Field of Search ................................. 404/17, 27, 71, 404/81, 82, 72, 75; 44/589; 106/281.1, 284.01; 524/59

[56] References Cited

U.S. PATENT DOCUMENTS

| | | |
|---|---|---|
| 3,852,046 | 12/1974 | Brown . |
| 3,909,474 | 9/1975 | Borchert et al. . |
| 4,028,293 | 6/1977 | Van Den Berg . |
| 4,052,219 | 10/1977 | Marrs et al. . |
| 4,548,962 | 10/1985 | Lindmark . |
| 4,797,434 | 1/1989 | Lovatt-Smith . |
| 5,252,641 | 10/1993 | Dawans . |

(List continued on next page.)

FOREIGN PATENT DOCUMENTS

| | | |
|---|---|---|
| 0332245 | 9/1989 | European Pat. Off. . |
| 2549794 | 5/1976 | Germany . |
| 117531 | 5/1993 | Japan . |
| 140464 | 6/1993 | Japan . |
| 7305619 | 10/1974 | Netherlands . |

OTHER PUBLICATIONS

Markus Stracke, *Manufacture of lightweight aggragate from recycled waste plastics, and uses of the lightweight concrete obtained with the aggregate*, Chemical Abstracts, vol. 115, p. 327 (1991), 141361y.

Kaplan et al., *Plasma surface treatment of plastics to enhance adhesion: an overview*, Plasma Science, Inc., Technical Notes, Feb. 1990, No. 9.

Kaplan et al., *Gas plasma treatment of Spectra fiber*, Plasma Science, Inc., Technical Notes, Apr. 1988, No. 4.

(List continued on next page.)

*Primary Examiner*—James A. Lisehora
*Attorney, Agent, or Firm*—Wood, Heron & Evans, L.L.P.

[57] ABSTRACT

An asphaltic concrete or paving material includes at least 5 percent, and preferably from 5 to 20 percent, of granular recycled plastic, which supplements or replaces the rock aggregate component of the mixture. The material produces a structurally superior paving material and longer lived roadbed. The plastic may include any and all residual classes of recyclable plastic, including thermosetting plastics and other plastics having little to no current widespread utility. The material produces roadbeds of higher strength with less total asphalt thickness and having greater water impermeability, and is most useful for all layers below the surface layer. The recyclable plastic component of the material is preferably a mixture of all recyclable classes 3 through 7, or of those materials from such classes from which potentially more valuable recyclable materials have been selectively removed. The paving product is preferably formed by a process of shredding or mechanically granulating used and industrial waste plastic to a no. 4 to ½ inch sieve size, and preferably to ¼ inch to ⅜ inch granules. The granules are then treated with an energized activating medium such as a plasma or a reducing flame, to activate the surface of the granules, preferably without burning or melting the plastic. The activated treated granules are then added to the aggregate and mixed with the asphalt binder to produce the paving material. A slurry or sand mix of plastic and binder may also be applied over an aggregate layer, base layer or roadbed.

27 Claims, 2 Drawing Sheets

U.S. PATENT DOCUMENTS

| | | |
|---|---|---|
| 5,296,025 | 3/1994 | Basin . |
| 5,302,638 | 4/1994 | Ho et al. . |
| 5,308,898 | 5/1994 | Dawans . |
| 5,367,007 | 11/1994 | Richards . |
| 5,380,773 | 1/1995 | Bellio et al. . |
| 5,558,703 | 9/1996 | Bredael . |
| 5,702,199 | 12/1997 | Fishback et al. .......................... 404/17 |
| 5,801,204 | 9/1998 | Johansson et al. ........................ 521/41 |

OTHER PUBLICATIONS

Lubomir Polakovic et al., *Utilization of plastic waste in asphalt mixtures used in road construction*, Chemical Abstracts, vol. 116, p. 350 (1992), 199880d.

Toshiharu Furuya et al., *Molding of waste asphalt and waste plastics*, Chemical Abstracts, vol. 118, p. 69, 214497w.

S.M. Mohseen et al., Unversity of Florida, Dept. of Material Science & Engineering, *Rheological properties characterization of scrap plastic modified asphalt*, Annual Technical Conference—Society Of Plastics Engineers, 1992, 50th(2), pp.2457–2463.

Hideya Tsuji, *Improved paving compositions*, Chemical Abstracts, vol. 119, (1993), 166576t.

Hideya Tsuji, *Asphalt compositions for paving and waterproofing*, Chemical Abstracts, vol. 119, (1993) 166575t.

Ulrich Winkler (article not translated), *Waste plastics in road construction*, Chemical Abstracts, vol. 120, p. 540, (1994), 142202n.

Tom Ford, *Polyphalt licenses paving product*, Plastic News, Sep. 18, 1995, pp. 17–18.

Author Unknown, *Tribe experiments with recylced plastic in asphalt mix*, Waste Dynamics, Oct. 1995.

FIG. 8

PLASTIC ASPHALT PAVING MATERIAL AND METHOD OF MAKING SAME

This application is a continuation-in-part of U.S. application by the inventors hereof, Ser. No. 08/555,527 filed Nov. 9, 1995, issuing as U.S. Pat. No. 5,702,199 on Dec. 30, 1997, and which is hereby expressly incorporated by reference herein.

FIELD OF INVENTION

This invention relates to pavements and paving materials and the use of recycled plastics in pavements and paving materials. More particularly, this invention relates to pavements, to paving materials for use therein, and to methods for making paving materials and pavements having unsorted, residual or other recycled or waste plastic as a component of the paving material or pavement.

BACKGROUND OF THE INVENTION

Paving materials such as asphaltic concretes that are used for roadways, parking areas, walkways and other traffic surfaces have been the subjects of various efforts to improve their properties. Some of these efforts have involved the addition of polymers, including plastics, in attempts to improve the flexibility, strength and life of the paving material. Such efforts have proved either ineffective or too costly.

The increasing need to dispose of or find new uses for previously used or recycled plastics and waste plastics has given incentives to efforts to introduce plastics from waste sources into building or paving materials, either to facilitate their disposal where it is hoped that their introduction does not degrade building or paving material and does not increase its cost, or where it is hoped that their introduction will provide a cost effective improvement in the properties of the building or paving materials. Work has been done to utilize low density plastic and films of selected and graded recycled plastic materials as an additive to the asphaltic binder component of asphaltic concrete paving material in an effort to improve the flexibility and reduce the propensity of the paving material to crack. This effort requires that the recycling task to collect suitable plastic material be selective, or that the material be specifically sorted from a general mixture of recycled plastic material. Such recycled plastic material has a cost that is significantly greater than that of the general ungraded or unsorted recycled plastic material mixture or of the residual recycled plastic material from which more useful grades have been removed.

For example, it has been proposed to melt polystyrene foam with asphalt, to add sand, and to mold the material as a concrete substitute, thereby utilizing the waste plastic. Further, it has been proposed to add waste polyethylene to asphalt for road construction to increase pavement durability. Decreased deformation resistance and increased hardness and ductility have been reported by adding other plastic waste in amounts of, for example, eight percent to paving compounds containing aggregate, where the plastic waste includes specific plastics made of specific combinations of low density polyethylene, cyclophane, cellophane, polypropylene, and polyvinyl dichloride. Fiber reinforced plastics and chopped glass have been proposed for addition to add to asphalt to improve wear resistance and water permeability.

Proposals to use specific waste plastics as additives to asphalt mixes have had the disadvantage of requiring specific collection of the individual material or the sorting of the desired material from the generally collected plastic waste. Such efforts calling for specific plastics are therefor costly. Furthermore, such efforts do little to solve the problem of utilization of vast unsorted, unsortable or unclassified bulk mixtures of plastic waste.

Waste plastics are found in several forms. In one form, bulk masses of particular identified plastic materials are produced as waste in the plastics industry. In other forms, plastics are found in the form of discarded articles and containers. Some such plastics, particularly plastic bags and plastic bottles, are collected in recycling activities. Recycled plastic bottles are classified according to a nationally recognized identification system known as the Plastic Container Code System (PCCS) into seven classes that are being identified by markings on the bottles. These classes are: class 1, polyethylene terephthalate (PETE), class 2 high density polyethylene (HDPE), class 3, vinyl and polyvinyl chloride or PVC (V), class 4, low density polyethylene (LDPE), class 5, polypropylene (PP), class 6, polystyrene (PS) and class 7, all other resins and layered multi-material. For convenience, these classes are used below to identify waste plastics that are also in a form other than that of bottles for which the classes were specifically established.

Recycled plastics of types corresponding to PCCS classes 1 and 2, and sometimes classes 4, 5 and 6, whether in the form of used containers or other forms made of the materials, have been sorted from the general mass of recycled material or separately collected, all at increased cost. Bulk mixtures of recycled plastics from more than one of the PCCS classes, particularly materials from class 7 and from class 3 when mixed with material from other classes, generally have been regarded as lacking utility and are accordingly routed to landfills. Such materials have lacked an alternative use or manner of disposition.

The employment of plastics in asphalt mixes has presented various problems. Many of the plastic additives have lacked an ability to bond to or combine with the asphalt binders of the mix. Chemical treatments have been proposed, but such treatments have been ineffective, add to the cost, and introduce additional noxious and toxic substances into the process, aggravating the waste disposal problems.

Accordingly, there remains a need for a low cost manner of enhancing the properties of paving material and there remains a need for a use of residual plastic waste, particularly unclassified or unseparated materials or materials of mixed classes.

SUMMARY OF THE INVENTION

An objective of the present invention is to improve the properties of pavements and of paving materials, particularly asphaltic concrete materials, and most particularly, to improve the strength and useful life of the pavements made of the paving materials.

A particular objective of the present invention is to improve the properties of paving materials at a minimum increase in cost or at a savings in cost from that of the standard asphaltic paving material.

A further objective of the present invention is to provide a use for recycled or waste plastic materials, particularly thermosetting and other PCCS class 7 materials, and other combinations of materials of more than one class, particularly classes 3 through 7.

A further objective of the present invention is to provide a method of making a paving material, particularly an asphaltic paving material, and of utilizing waste plastic in paving material manufacture.

According to principles of the present invention, there is provided a method of making a paving material that includes the step of providing bulk residual plastic waste materials including materials of the types corresponding to PCCS classes 3–7, and preferably including materials of more than one such class, the step of processing the plastic to a form suitable for combining with asphalt, and the step of combining the processed plastic with asphaltic binder. Preferably, the processed plastic serves as an aggregate in the paving material, and preferably replaces at least some of, or combines with rock aggregate to form an asphaltic concrete paving material. Further, the process of the invention may include the step of forming a pavement with the paving material. In addition, a paving material and pavement are provided that are made according to such process.

According to the preferred embodiment of the invention, recycled plastic material that is unclassified, or is in the form of bulk material containing plastics corresponding to more than one of the PCCS classes 3 through 7, or contains thermosetting plastics and other plastics of PCCS class 7, are provided. The plastic material is either pelletized, is shredded or otherwise mechanically granulated, or otherwise formed into particles. Conventional asphaltic binder material and graded aggregate that includes rock particles ranging in size are also provided. The binder and plastic material are, in the most common application of the invention, premixed as an aggregate component with binder and rock aggregate and applied as a pavement. In alternative applications, the processed plastic is mixed with the binder, then applied as a slurry, for example over an existing pavement, is applied over a base or a prelaid layer that may contain a rock aggregate, with which it combines to form a pavement.

Typically the aggregate will include from five to seven sieve sizes ranging from no. 40 to three-fourths inch in size, or preferably from no. 200 to one inch in size. The particles of plastic are preferably of a size that corresponds to one of the intermediate sizes of the rock aggregate. Preferably further, the paving material is formed by mixing from five to twenty-five percent or more of the plastic particles, measured by volume, with the rock aggregate and the asphaltic binder. In one preferred form, an amount of rock aggregate is used which may be varied from the standard ratio mixture of rock aggregate and binder, and preferably by reducing the amount of mid-range or correspondingly sized rock aggregate by an amount not more than the amount of added plastic, and preferably by an amount that is somewhat less than the amount of added plastic. Preferably, the particles of plastic are in the one-eighth to one-quarter inch sieve range, and may be three-eighths inch or larger. The particles of plastic will be generally flatter and more elongated in shape than the shapes of the particles of the rock aggregate component of the mixture.

Further in accordance with the preferred embodiment of the present invention, the plastic particles are further processed to activate the surfaces of the plastic particles to increase the surface tension and to cause free or active carbon atoms to be present in the molecules of the plastic material at the particle surface. The activation of the particle surfaces is preferably performed with minimal heating, burning or melting of the plastic, and may be achieved by exposing the surface to high energy treatment-gas atoms, ions or molecules for a limited duration. Such a gas may be in the form of a flame, or in the form of a plasma or corona, or other electrically or otherwise enhanced gas or vapor, that will cause the activation or increased energization at the surfaces of the plastic particles.

Treatment of the plastic is achieved, in one embodiment described below, by exposing the surfaces of granulated plastic particles to a reducing flame, preferably by exposing the particles to the outer envelope of such flame. The exposure may be carried out by passing the particles on a conveyor through the flame, dropping the particles through a flame treatment tower or otherwise contacting the particles briefly with the flame.

The use of a ionized or plasma enhanced gas to activate the particle surfaces is also suitable, and may be carried out by transporting the particles on an electrically conductive conveyor. Other forms of gas reactant treatment may be used to activate or etch the surface. In a preferred process, granulated plastic particles are fed into the top of a vertical plasma treatment column with the gas that occupies the space between the particles being ionized by arrays of electrodes along the height of the column. The ionized gas in the column plasma treats the surfaces of the particles as the particles pass through the column from top to bottom, so that the particles are discharged from the bottom of the column with highly stable activated surfaces.

The activated surfaces of the plastic particles are thought to enhance the bonding between the asphaltic binder and the plastic particles and do so with minimal or insignificant heating of the plastic. Such plastic particles are blended with the asphaltic binder and with rock aggregate at normal low temperatures, such as at temperatures below 300° F. The treated plastic is preferably used to form a paving material by combining it with a binder before the activated state of the surfaces of the particles decays. Typically, this time ranges from days to months, depending on the treatment process used, the extent of the treatment and other various treatment parameters such as the energy level of the treatment gas and the time duration of the particles in the gas during treatment.

The present invention provides a paving material and pavement that is has is believed to be up to fifty percent or more stronger than the required strength of road paving materials or than standard asphaltic concrete that is not modified with the addition of the plastic particles as described above. The invention provides a use for the low utility or otherwise useless recycled and waste plastic compositions, and provides a use for unclassified or residual class plastic material. The cost of the added plastic material is very low, with some untreated plastic material approaching no cost at all, compared with the cost of its disposal. The invention allows the reduction in the total amount of paving material used for making a pavement in proportion to the increased strength of the material, thereby providing a cost savings in the reduced amount of asphaltic concrete required, which may more than offset the cost of providing, treating and blending the plastic.

These and other objectives and advantages of the present invention will be more readily apparent from the following detailed description of the of the preferred embodiments of the invention.

DETAILED DESCRIPTION OF THE PREFERRED EMBODIMENT

One preferred embodiment of the invention is set forth herein in the form of a description of a test or example of a process (FIG. 1) of making a paving material. In accordance with this preferred embodiment of a method of the present invention, a standard asphaltic mix is selected (70). One such suitable mix is, for example, New Mexico State Highway and Transportation Department (NMSHTD) type I A asphaltic mix. Further, a mixture of local rock aggregate suitable for asphaltic concrete for use in highway construction is selected (71). Such a rock aggregate mixture used in this example includes particles of the following sizes, as set forth in Table 1:

TABLE 1

Figure 1:
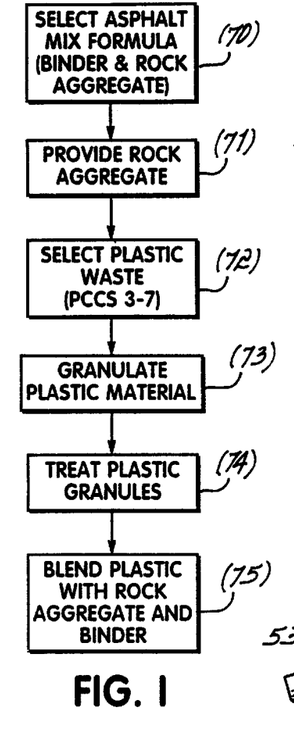
FIG. 1 is a flowchart of one preferred embodiment of a method according to the present invention.

| Sieve Size | Percent Passing |
| --- | --- |
| 1 inch | 100 |
| ¾ inch | 86 |
| ½ inch | 67 |
| ⅜ × inch | 57 |
| No. 4 | 42 |
| No. 10 | 34 |
| No. 40 | 21 |
| No. 200 | 5.1 |

Where aggregate is used as a component of the paving material, as in the illustrated example, this step (71) may be performed at any time prior to the blending step (75) discussed below. In other applications, the aggregate providing step (71) is omitted from the paving material blended in step (75), but may be in a previously applied layer of pavement to which the blended plastic and binder are to be applied.

In the example, a volume of bulk recycled plastic material is selected (72).

The bulk plastic material may be ungraded or unsorted and thereby predominantly contain plastics of types corresponding to PCCS classes 1 through 7. Preferably the plastic is a residual ungraded bulk of recycled plastic from which most of the items of class 1 (polyethylene terephthalate) and class 2 (high density polyethylene) have been removed. It is also contemplated that some of the class 4 plastic (low density polyethylene) and low density foam plastic from class 6 (polystyrene) may have been removed, as well as other grades or classes for which other uses have been found. The bulk material may contain plastic bottles and other waste plastic articles, layered, thermosetting or miscellaneous plastic articles from class 7, PVCs from class 3, or masses of waste plastic from plastic production and molding industries, for example. In the example, a representative average sample including primarily an assortment of plastic waste corresponding to the plastics of classes 3 through 7 was selected. The plastic waste may include used containers but may contain, in addition or in the alternative, other plastic waste having compositions corresponding to the PCCS classes.

Figure 2:
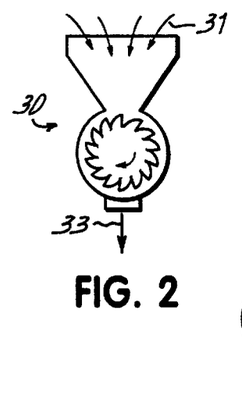
FIG. 2 is a diagram of a shredder suitable for use with the method of FIG. 1.

Then, the plastic material is granulated (73). The granulation process typically involves the shredding of the plastic material 30 in a shredder 31 that employs a plurality of knife blades 32 to reduce the mass of plastic to a uniform blend of particles 33, as illustrated in FIG. 2. The particles include a large percentage of generally flat flake or plate-like pieces that are generally more elongated than the particles of the rock aggregate referred to above. In the example, the sizes of the granulated plastic particles included 18 percent that passed sieve no. 10, with all of the particles passing sieve no. 4. It is contemplated, however, that, for use with the rock aggregate described above, most of the plastic particles will be in the ¼ inch to ⅜ inch range, and perhaps larger. They will nonetheless be smaller than, and preferably less than half the size of, the largest rock aggregate particles for applications in which the plastic particles are to be blended with the aggregate before paving to form an asphalt mix.

The granulated plastic particles are then treated (74) to activate the particle surfaces. The manner of activating the surfaces of the plastic particles is, according to one embodiment of the invention, by exposing the surfaces of the particles to a flame treatment. With the flame treatment, It is preferable to expose the plastic particles to the flame intermittently, if increased exposure is desired, than to maintain the flame constantly, which could unnecessarily heat the plastic, or could burn or melt the plastic. The flame in this embodiment is preferably a reducing flame.

A reducing flame may be produced by natural gas, propane, or other fuel. In the example, an oxyacetylene reducing flame is used and the plastic particles were spread on a screen and brushed repeatedly with the flame from above and below, using a torch maintained at a distance of about twelve inches from the flame, with agitating and turning of the plastic particles. The duration or dwell of the flame on any of the particles is preferably kept sufficiently short to avoid any significant melting or burning the particles or causing a visually perceivable change in the appearance of the plastic particles. A small percentage of the plastic that might be of the lower density, lower melting point types or include exceptionally thin sheet shreds or narrow fibers may, in such a process, melt or char without adversely affecting the process or paving material to be produced.

Figure 3:
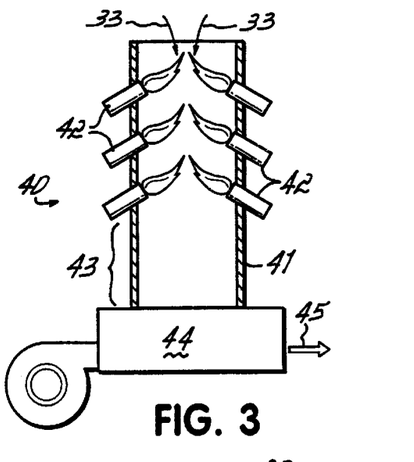
FIG. 3 is a diagram of a flame treatment tower suitable for use with embodiments of the method of FIG. 1.

In one form of the preferred embodiment of the invention, it is contemplated that the activating gas treatment of the granulated plastic particles 33 be carried out in a flame treatment tower 40, as illustrated in FIG. 3. Such a tower may be a vertically elongated cylindrical column 41 having a plurality of inwardly directed, and possibly upwardly inclined gas jets 42 spaced around the column and at vertical intervals. The fuel to oxygen mixture of the flame is set to create a slightly oxygen poor or reducing flame throughout the center of the column through which the granulated particles are dropped. Depending on the height of the column used, the particles 33 may be repeatedly dropped through the flame. Use of a flame treatment tower 40 in which the particles are dropped through the flame, rather than the use of a conveyor or other structure to support the particles for treatment with the flame, avoids possible sticking to the support caused by a softening or melting of a small percentage of the plastic material in the flame. Such a tower should have a cool air region 43 at the bottom of the tower to facilitate a rehardening of any softened plastic, and the collection of treated particles 45 at the bottom of the tower should include a fluidized air bed 44 or agitating mechanism to avoid a sticking together of the treated particles.

Figure 4:
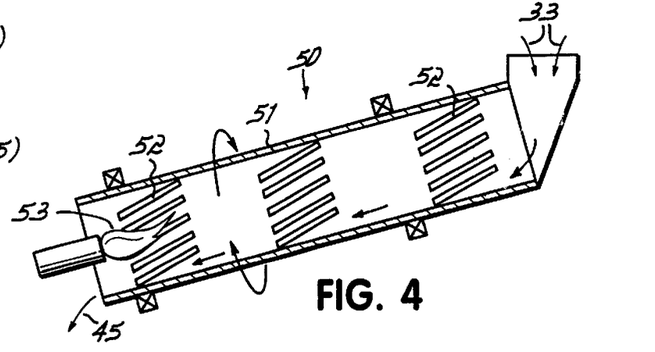
FIG. 4 is a diagram of an alternative form of flame treatment apparatus suitable for use with embodiments of the method of FIG. 1.

In an alternative form of the preferred embodiment of the invention, flame treatment is performed in an inclined drum tumbler 50, as illustrated in FIG. 4. The tumbler 50 is in the form of an elongated cylindrical barrel 51, inclined at less than 20 or 25 degrees to the horizontal, and preferably at about 10 to 15 degrees to the horizontal. The barrel has a plurality of longitudinal vanes 52 running generally parallel or slightly spiraled relative to the axis of the barrel. The reducing flame 53 is made to flow upwardly through the center of the barrel around the axis thereof as the barrel is rotated. The granulated plastic particles 33 are fed into the top of the barrel and proceed to be tumbled through the flame several times as they proceed toward an outlet at the bottom end of the inclined cylinder 51. The constant rotary motion of the barrel, which is kept relatively cool, prevents the sticking to the barrel of any particles 45 that might have been softened.

It is further contemplated that the particles may, for some uses, be pelletized following shredding or granulation and prior to the activating treatment. To pelletize the particles of plastic, the particles may be fed, for example, from a hopper into a pelletizing extruder in which a mild heating element would heat the particles to soften some of the plastic components and promote sticking of the particles. An auger then compresses the warmed particles and extrude them through an extrusion die to be cut into pellets of more or less uniform size. Such pellets may then be treated as described above.

Figure 5:
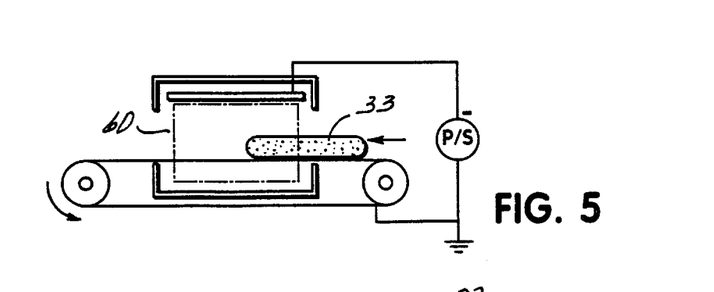
FIG. 5 is a diagram of one form of a plasma treatment apparatus suitable for use with embodiments of the method of FIG. 1.

In other embodiments, a plasma, corona or ionized gas may replace or be combined with the flame. For example, as illustrated FIG. 5, treatment is carried out by exposing the particles to ionized gas, plasma, corona discharge 60 or other electrically energized treatment medium. Such a treatment may be carried out by presenting the plastic particles 33 upon a conveyor 61, which may be effective to maintain charge on the plastic particles, while exposing the particles to the treatment medium 60.

Figure 8:
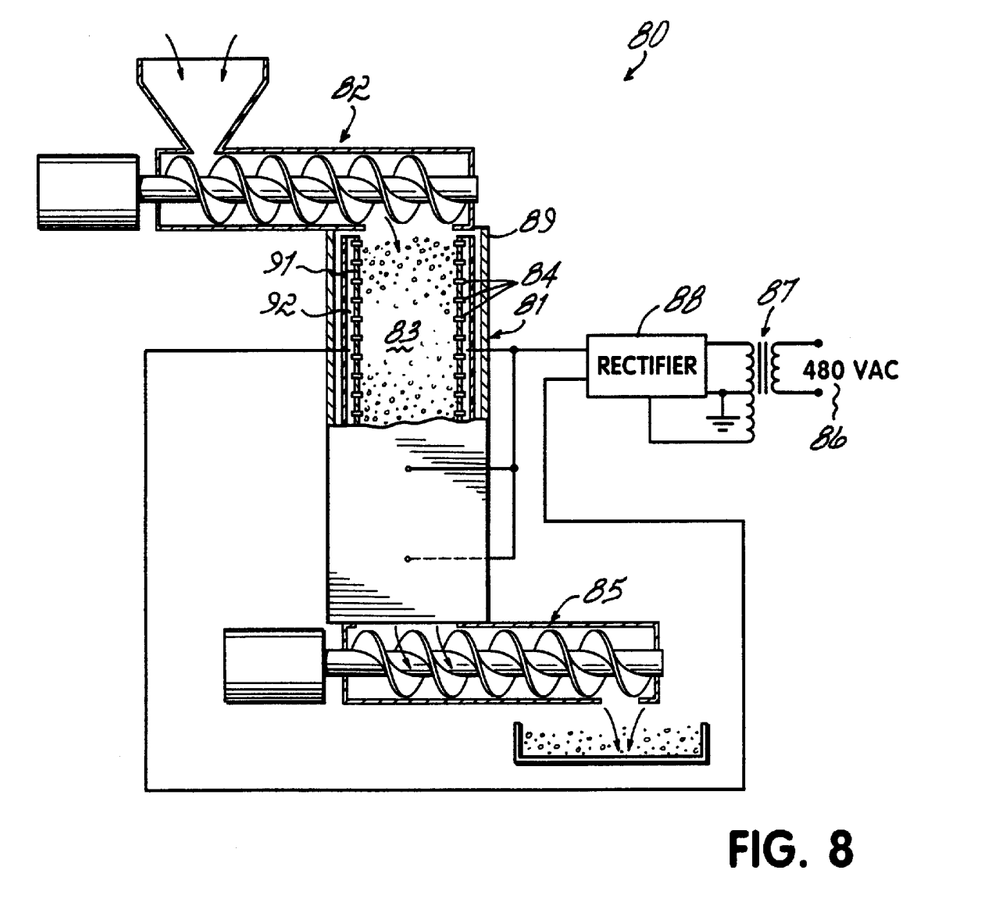
FIG. 8 is a diagram, similar to FIG. 5, of an alternative form of a plasma treatment apparatus suitable for use with embodiments of the method of FIG. 1.

An alternative apparatus 80 for plasma treatment of the particles is illustrated in FIG. 8, in which a vertical plasma treatment tower or column 81 is employed. The column 81 is equipped at its top with a hopper fed infeed auger or other loading device 82 which is capable of loading a continuous stream of granulated waste plastic particles into the column 81 from its top. The particles are preferably allowed to fill the column and form a loosely stacked bulk mass of the particles 83 in the hollow interior of the column 81.

Opposite sidewalls of the column 81 are provided with electrodes 84 in the form of arrays of pins, electrically insulated from a housing 89 of the column 81, which is preferably formed of a metal and grounded. The electrodes 84 connected to a high voltage power supply which energizes the electrodes 84 sufficiently to produce an electrical discharge in the gas that occupies the spaces between the particles in the column 81. Preferably, the discharge results in a purplish-blue glow resulting from the ionization of gas within the column 81. The electrodes 84 are preferably located on opposite sides of the column 81 in the upper half of the column and on the front and back of the column 81 on the bottom half of the column 81 to better insure uniform treatment of the particles as they descend vertically down the column.

At the bottom of the column 81 is provided an outfeed auger 85, which removes treated particles of bulk plastic material from the bottom of the column 81. After the column is filled, the plasma electrodes are energized, and the plasma treatment has been applied to the particles in the filled column 81 for a sufficient period of time to activate the surfaces of the particles, the outfeed auger 85 and the infeed auger 82 are operated at the same bulk transfer rates to cause a constant volume flow of particles into the column at the top, downwardly through the column 81 and the plasma, and out of the outfeed 85 at the bottom of the column 81. An initial quantity of about one thousand pounds of treated plastic material is run out of the apparatus 80 when it is first started before fully treated plastic is consistently produced. This initial quantity is collected and refed into a hopper to the infeed auger 82 and retreated. The column 81 may be provided with air jets to free the bulk plastic material should it become compacted in the column.

In the plasma treatment of the plastic particles, the surfaces of the particles are preferably treated to a desired surface tension, preferably which produces an ASTM wettability measurement of 50–55 dynes/cm, and preferably of about 68–70 dynes/cm or higher. For a nominal treatment rate of approximately 500–550 cubic feet per hour of plastic, which, for example, may have a bulk density of about 27 pounds per cubic foot, the column 81 is preferably 10 to 14 feet tall with an approximately 13 inch square internal cross-section. Preferably, the electrodes 84 are energized to a high voltage determined by the geometry of the column 81 and electrodes 84 to ionize the gas within the chamber. The high voltage is supplied from a rectified output of rectifier 88 connected to a center-tapped secondary winding of a high voltage transformer 87. In one preferred embodiment, the transformer is connected to an input 86 of about 440–480 volts AC, 60 Hz, drawing about 30 input amps. The output of the secondary winding of the transformer for an apparatus of this configuration and capacity is about 5 kVA. This power is adequate for producing paving material in these quantities. For larger scale paving projects one skilled in the art can appreciate that larger scale equipment is desired and providing such would be within such person's skill.

Electrodes 84 may take many configurations and forms. For example, the arrays of electrodes may be arranged in a ¼ inch grid pattern on polyethylene sheets 90. Contact of the electrodes 84 to the output rectifier 88 can be made with the use of conductive oil layer 92 sealed in a thin volume that communicates with the outer ends of the electrodes 84. Plasma treatment equipment and the technology for designing and producing such equipment is available from Electro Engineering, 2319 Grissom Drive, St. Louis, Mo. 63146.

The plasma treatment can be satisfactorily performed where the gas between the particles in the column 81 is air. Much higher rates of productivity are expected where an inert gas such as argon is used. The argon tends to support the plasma better and is less likely to result in a burning of the plastic.

Other gases

When the plastic has been treated, particularly by flame, it is preferred that it be used as soon as possible, preferably within a day or days of treatment, or that the treated plastic be kept out of contact with freely flowing air or sunlight until used. With plasma treatment, it is found that the a longer lasting activated particle surface results. As such, plasma treated particles can be stored in bulk for from several weeks to several months without substantial degradation of the activated state of the particle surfaces. Nonetheless, use of the treated particles of plastic material as soon after treatment as possible is preferred.

Use of the plastic to produce an asphaltic pavement layer preferably involves the step of blending (75) the plastic particles with rock aggregate and with asphaltic mix binder in a manner that is conventional for the formulation of asphaltic paving material for road surfaces (FIG. 1), with the plastic particles being added as an alternative or supplement to the rock aggregate in the overall mix. The plastic particles function more as the rock aggregate component of the asphaltic concrete than as the asphaltic binder. Only a minor or incidental portion of the plastic, particularly that which is lower density and lower melting point that might remain in the plastic material bulk, would soften and tend to blend with the asphaltic component. Instead, in the preferred embodiment of the invention, the plastic particles supplement the mid-size rock aggregate components. The percentage of the mid-size particles of the rock aggregate may be reduced in the mix, although that is usually not necessary.

Figures 6, 7:
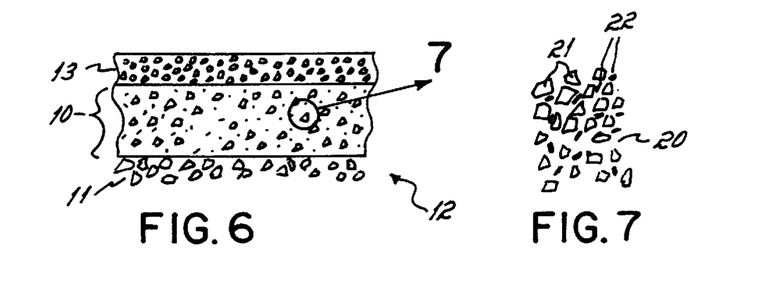
FIG. 6 is a cross-sectional diagram of a roadway according to certain embodiments of the present invention.
FIG. 7 is an enlarged view of a portion of FIG. 6.

Rather than blending a mixture of the treated plastic, binder and rock aggregate, the present invention also provides its advantages when used as a mixture of plastic with asphaltic or oil based binder on road bases, or by applying such a mix over a rock aggregate base layer, where the binder and plastic mix flow down into the base An example of the he road surface produced is illustrated in FIG. 6 and includes an asphaltic layer 10 overlying the base gravel layer 11 to form a roadway 12. The asphaltic layer 10 may not be the top layer of the roadway 12, but the roadway 12 may also include a surface layer 13 overlying the asphaltic layer 10. The asphaltic layer 10, as illustrated in FIG. 7, is formed of an asphalt binder 20 and a rock aggregate 21 having mixed therewith at least five percent by volume of plastic particles 22, most of which are no. 10 sieve size or larger. The plastic particles 22 have treated activated surfaces. A major portion, and preferably substantially all, of the plastic particles 22 are of a plastic material composition corresponding to PCCS classes 3 through 7. Preferably, most of the particles 22 of plastic are of a size at least ⅛ inch large, and preferably are of a size less than ⅜ inch large, although smaller and larger size particles may be used. The plastic material preferably includes at least thirty percent recycled plastic from the group consisting of thermoset plastics, PVC, and high density polypropylene and polystyrene.

The particles of plastic are believed to strengthen the paving material by adding a slightly flexible interlocking aggregate component that bonds with the asphaltic binder with a partially chemical molecular bond, developing an increased shear resistance of the paving material. The paving material is also more highly impermeable to water, preventing such water from propagating into the gravel bed or subgrade.

Improved properties of the paving material made in accordance with the method of the present invention are illustrated by the example described above. In that example, the treated plastic particles were tested by blending them into the asphaltic mix (using asphaltic concrete 4.4% Navajo 60/70 asphalt cement) that was first heated to a temperature of 265° F. then mixed with the plastic at room temperature. The mixing temperature is preferably that which produces an asphalt cement viscosity of 170+/−20 centistokes kinematic. The plastic was added to the asphaltic mix at a ratio of ten percent by volume, determined from the loose unit weights of the plastic and asphaltic mix. The material was tested by placing it in molds and compacting it to seventy-five blows per side at approximately 250° F. For comparison, other samples were similarly prepared, one sample using the standard asphaltic concrete mix without plastic, and two samples using untreated plastic of the same composition, one added at five percent by volume to the asphaltic mix and one added at ten percent by volume to the mix. The loose unit densities of the components of the mix for the tests were 1.45 grams per cubic centimeter (90.5 pounds per cubic foot) for the asphaltic concrete mix and 0.36 grams per cubic centimeter (22.2 pounds per cubic foot) for the treated and untreated plastic. The five percent by volume of plastic mixes included 1135.88 grams (2.5 pounds) of asphaltic concrete mix and 14.67 grams (0.032 pounds) of plastic, and the ten percent by volume of plastic mixes included 1076.10 grams (2.370 pounds) of asphaltic concrete mix and 39.69 grams (0.065 pounds) of plastic. The tests performed as set forth below and the component analysis as set forth above employed the standards set forth in Table 2:

TABLE 2

| Extraction | ASTM D-2172 |
|---|---|
| Sieve Analysis | ASTM C-136 |
| Bulk Unit Weight | ASTM D-2726 |
| Rice Unit Weight | ASTM D-2041 |
| Marshall Flow/Stability | ASTM D-1559 |

The results of the test were as follows, as set forth in Table 3:

TABLE 3

| Marshall Properties of Asphaltic Concrete | | | | |
|---|---|---|---|---|
| | No plastic | 5% untreated | 10% untreated | 20% treated |
| Bulk Unit Wt. gms/cm³(pcf) | 2.366 (147.4) | 2.339 (145.7) | 2.261 (140.9) | 2.272 (141.5) |
| Rice Wt. gms/cm³(pcf) | 2.419 (150.7) | 2.396 (149.3) | 2.369 (147.6) | 2.370 (147.7) |
| Air Voids % | 2.2 | 2.4 | 4.6 | 4.1 |
| Stability pounds | 2821 | 3078 | 2432 | 3404 |
| Flow ¹⁄₁₀₀ in | 11 | 12 | 11 | 11 |

The above results can be compared with the NMSHTD stability requirements of 1640 pounds for non-interstate highways and 1800 pounds for interstate highways. It is found from the tests set forth above that, starting with 2821 pound asphaltic concrete (per the test), the strength increased with the addition of untreated plastic to where it had increased by almost ten percent with the addition of 5% untreated plastic particles. However, the strength decreased as the percentage of untreated plastic particles in the mix increased. With the treated plastic, the strength increased with the addition of the plastic, being about 21% higher than the original asphaltic concrete with the addition of ten percent plastic. It is believed that the strength will exceed that of the original asphaltic concrete mix with treated plastic at up to about 25% with optimally treated and optimally sized plastic particles. Other properties such as flexibility, water impermeability, crack resistance and durability are also expected to be improved over this range.

Those skilled in the art will appreciate that the application of the present invention is herein are varied, and that the invention is described in preferred embodiments Accordingly, additions and modifications can be made without departing from the principles of the invention. Accordingly, the following is claimed:

What is claimed is:

1. An asphaltic paving material comprising a mixture of:
   an asphalt binder; and
   an aggregate including at least five percent by volume of mechanically reduced particles of waste or recycled plastic having activated surfaces, which particles, prior to mixing with the binder, have been mechanically reduced in size and thereafter treated on the surfaces thereof with an energized vapor medium to activate their surfaces to enhance bonding with the binder without substantially melting or burning the particles.

2. The paving material of claim 1 wherein:
most of the particles of the plastic are of at least no. 10 sieve size.

3. The paving material of claim 2 wherein:
most of the particles of plastic are of a size less than ⅜ inch large.

4. The paving material of claim 1 wherein:
the aggregate includes between approximately seventy and ninety-five percent by volume natural rock at least half of which includes substantial portions ranging in size from no. 40 sieve to no. ¾ inch sieve.

5. The paving material of claim 1 wherein:
most of the particles of plastic are of a size at least ⅛ inch large.

6. The paving material of claim 1 wherein:
the particles of plastic aggregate have a major portion thereof of a composition corresponding to one or more of PCCS classes 3 through 7.

7. The paving material of claim 1 wherein:
the particles of plastic are substantially all from the group consisting of plastic material corresponding to PCCS classes 3 through 7.

8. The paving material of claim 1 wherein:
the plastic material includes a composition of a plurality of different plastic materials corresponding to at least two different ones of PCCS classes 3 through 7.

9. The paving material of claim 1 wherein:
the plastic material includes at least thirty percent recycled plastic from the group consisting of thermoset plastics, PVC, and high density polypropylene and polystyrene.

10. An asphaltic paving material comprising a mixture of:
an asphalt binder; and
an aggregate including at least five percent by volume of particles of waste or recycled plastic, which particles, prior to mixing with the binder, have been mechanically reduced in size and thereafter treated on the surfaces thereof with an energized medium to activate the surfaces to enhance bonding with the binder and wherein
the particles of plastic are made according to the process comprising the steps of:
mechanically reducing plastic material to granules; and
treating the surfaces of the granules with an activating medium in the form of a plasma that is sufficiently active to activate the surfaces of the granules to enhance their ability to bond to the binder.

11. The paving material of claim 10 wherein:
the mechanically reducing step reduces the plastic material to granules, most of which are less than ⅜ inch in size.

12. The paving material of claim 10 wherein:
the plastic material includes predominantly residual recycled plastic material.

13. An asphaltic paving material comprising a mixture of:
an asphalt binder; and
an aggregate including at least five percent by volume of particles of waste or recycled plastic, which particles, prior to mixing with the binder, have been mechanically reduced in size and thereafter treated on the surfaces thereof with an energized medium to activate the surfaces to enhance bonding with the binder and wherein
the particles of plastic are made according to the process comprising the steps of:
mechanically reducing plastic material to granules, most of which are at least ⅛ inch in size; and
treating the surfaces of the granules with an activating vapor at a temperature sufficiently low or for a time sufficiently short to avoid substantial melting, burning or other perceptible change to the surface of the granules, the medium being sufficiently active to activate the surfaces of the granules.

14. An asphaltic paving material comprising a mixture of:
an asphalt binder; and
an aggregate including at least five percent by volume of particles of waste or recycled plastic, which particles, prior to mixing with the binder, have been mechanically reduced in size and thereafter treated on the surfaces thereof with an energized medium to activate the surfaces to enhance bonding with the binder and wherein
the particles of plastic are made according to the process comprising the steps of:
mechanically reducing plastic material to granules,
treating the surfaces of the granules with an activating medium sufficiently active to activate the surfaces of the granules to enhance their ability to bond to the binder, and
the treating step including the step of treating the surfaces of the granules with activating vapor in the form of a reducing flame.

15. A method of making an asphaltic paving material comprising the steps of:
providing bulk waste or recycled plastic material;
mechanically granulating the plastic material to form particles thereof;
treating the particles in an activating medium selected from the group consisting of a flame, an ionized corona or a plasma and thereby activating the surfaces of the particles; and
while the surfaces are activated, blending an asphalt binder with an aggregate that includes at least five percent of the treated particles of the plastic material.

16. The method of claim 15 wherein:
the providing step includes the step of providing plastic material that includes a majority of plastic materials of a composition corresponding to one or more of PCCS classes 3 through 7.

17. The method of claim 15 wherein:
the granulating step includes the step of granulating the plastic material to form particles thereof that are predominantly between no. 10 sieve size and ½ inch in size.

18. The method of claim 15 wherein:
the blending step includes the step of blending the binder with an aggregate that includes from seventy to ninety-five percent rock particles of a mixture of sizes including a substantial portion smaller and a substantial portion larger than most of the particles of the plastic material to form the paving material.

19. The method of claim 15 wherein:
the granulating step includes the step of granulating the plastic material to form particles thereof predominantly larger than ⅛ inch in size.

20. The method of claim 15 wherein:
the granulating step includes the step of granulating the plastic material to form particles thereof predominantly smaller than ⅜ inch in size.

21. The method of claim 15 wherein:

the treating step includes the step of treating the surfaces of the particles with activating medium in the form of a flame.

22. The method of claim 15 wherein:

the treating step includes the step of treating the surfaces of the particles while maintaining the temperature of the particles sufficiently low and for a time sufficiently short to avoid substantial melting and burning of the particles.

23. The method of claim 15 wherein:

the treating step includes the step of treating the surfaces of the particles with activating medium in the form of a ionized corona or plasma.

24. A method making an asphalt pavement comprising the steps of the method of claim 15 and further comprising the step of:

forming an asphalt layer of the pavement with the paving material.

25. A pavement made according to the method of claim 24.

26. A paving material made according to the method of claim 15.

27. The method of claim 15 wherein:

the treating step includes the step of treating the surfaces of the particles with activating medium in the form of a plasma.

* * * * *